Sept. 1, 1936.　　　　G. M. DEMING　　　　2,053,216
METHOD FOR WELDING STRUCTURAL MEMBERS
Original Filed May 16, 1930　　　2 Sheets-Sheet 1
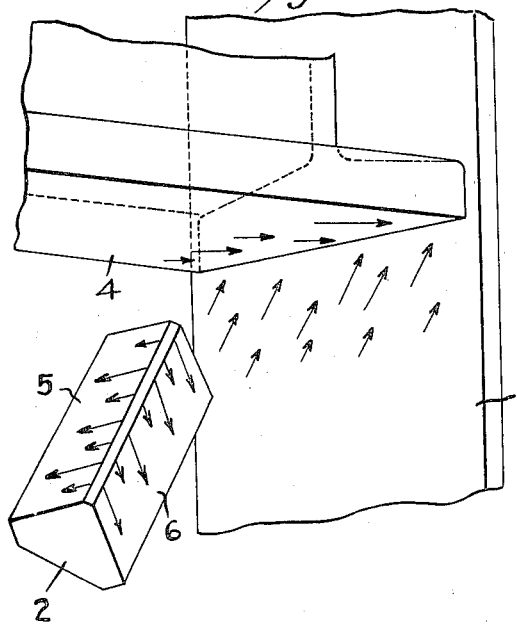
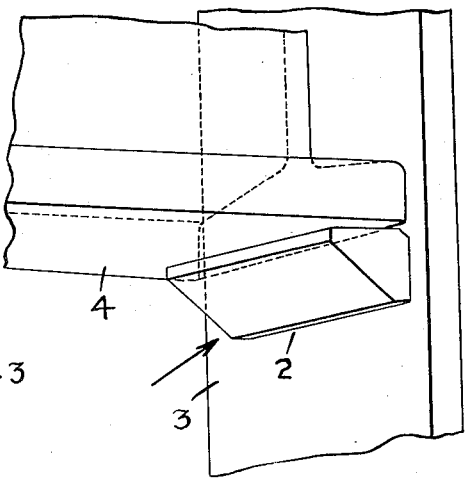
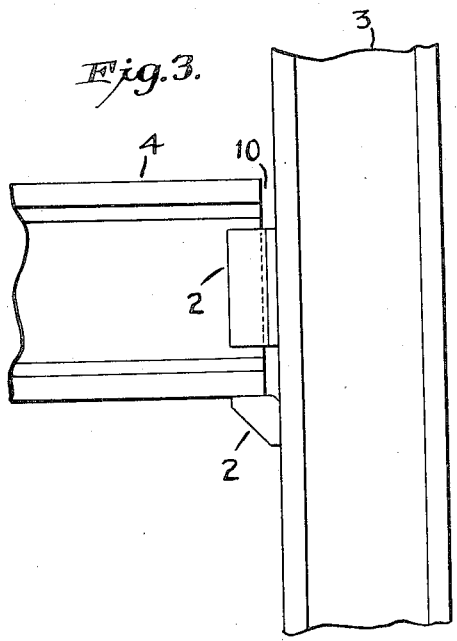
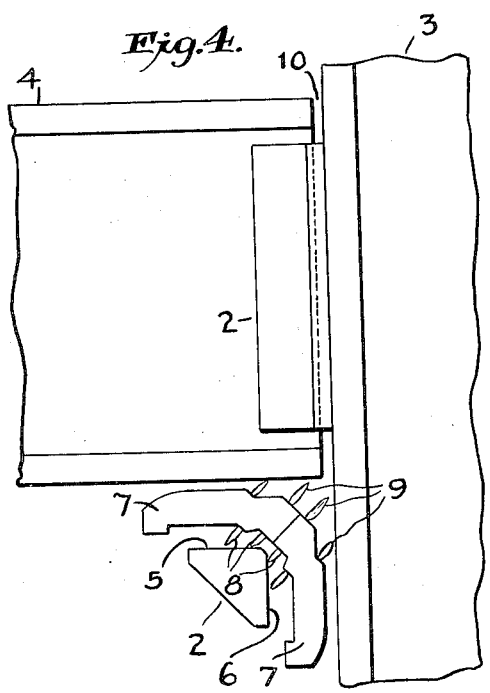
INVENTOR
George M. Deming
BY
ATTORNEY Patented Sept. 1, 1936

2,053,216

UNITED STATES PATENT OFFICE 2,053,216

METHOD FOR WELDING STRUCTURAL MEMBERS

George M. Deming, East Orange, N. J., assignor to Air Reduction Company, Incorporated, New York, N. Y., a corporation of New York Application May 16, 1930, Serial No. 452,899
Renewed December 19, 1935

6 Claims. (Cl. 113—112)

The invention relates to a method for uniting structural members or other parts, more especially structural steel shapes such as are used in building construction, by oxyacetylene welding. Such work has been done in the ordinary manner with hand torches, the operation being one of fusing together adjoining portions of the members with added metal melted from a rod or wire.

Objects of this invention are to reduce the amount of metal which is fused and to reduce the amount of heat lost by radiation and conduction. A further object is to make all of each weld, or a certain unit length of weld, at one time and in one operation. Other advantages of the invention will become apparent.

In accordance with the present method a joining piece or a special joining block is employed. By merely fusing the surfaces of this block and of the structural members which are to contact with it, it is possible to bring these surfaces quickly to the proper state for the formation of a sound weld, which is thereupon made by pressing or forcing the jointing block and the structural shapes into mutual contact. As contrasted with the usual fusion welding practice, it is not necessary that a large mass of metal be melted in order to produce the welded joint. Sufficient heat may be supplied not only to fuse the surfaces of the joining block but also to soften the metal of this block for a substantial depth, in order to overcome any irregularities and to insure uniform contact between the weld surfaces of the block and the structural members when the block is pressed into place.

The high velocity at which the oxy-fuel-gas mixture is delivered from the jet orifices makes it possible to blow the surfaces clear of oxides and foreign matter by the gases of combustion while these surfaces are being rapidly fused, and the flame envelope gases, which are of a reducing character, are employed to protect the molten films from oxidation until the surfaces are forced into contact.

The accompanying drawings illustrate steps of the method, a welded joint made between two structural members in accordance with the invention and the preferred form of apparatus for executing the invention.

In these drawings:

Fig. 1 is a perspective view of the proximate portions of a structural upright and a structural cross-member or beam, showing also the joining block adjacent the included angle but not, however, in true preliminary position, the arrows indicating in a general way the directions of the flames which fuse two angularly related surfaces of the joining block and corresponding areas of the surfaces of the structural members forming an included angle into which the block is to be introduced;

Fig. 2 is a similar perspective view showing the joining block in final position uniting the members, the arrow indicating the direction in which force is applied to set the block with the fused surfaces in intimate contact;

Fig. 3 is an elevation of a joint between two such members, showing a filler block welded in the included angle between the bottom of the beam and the flanges of the upright and another such block in the angle between the flanges of the upright and the web of the beam;

Fig. 4 is an elevation showing the relation between the torches, the joining block and the structural members during the period of heating and surface fusion.

Figure 5:
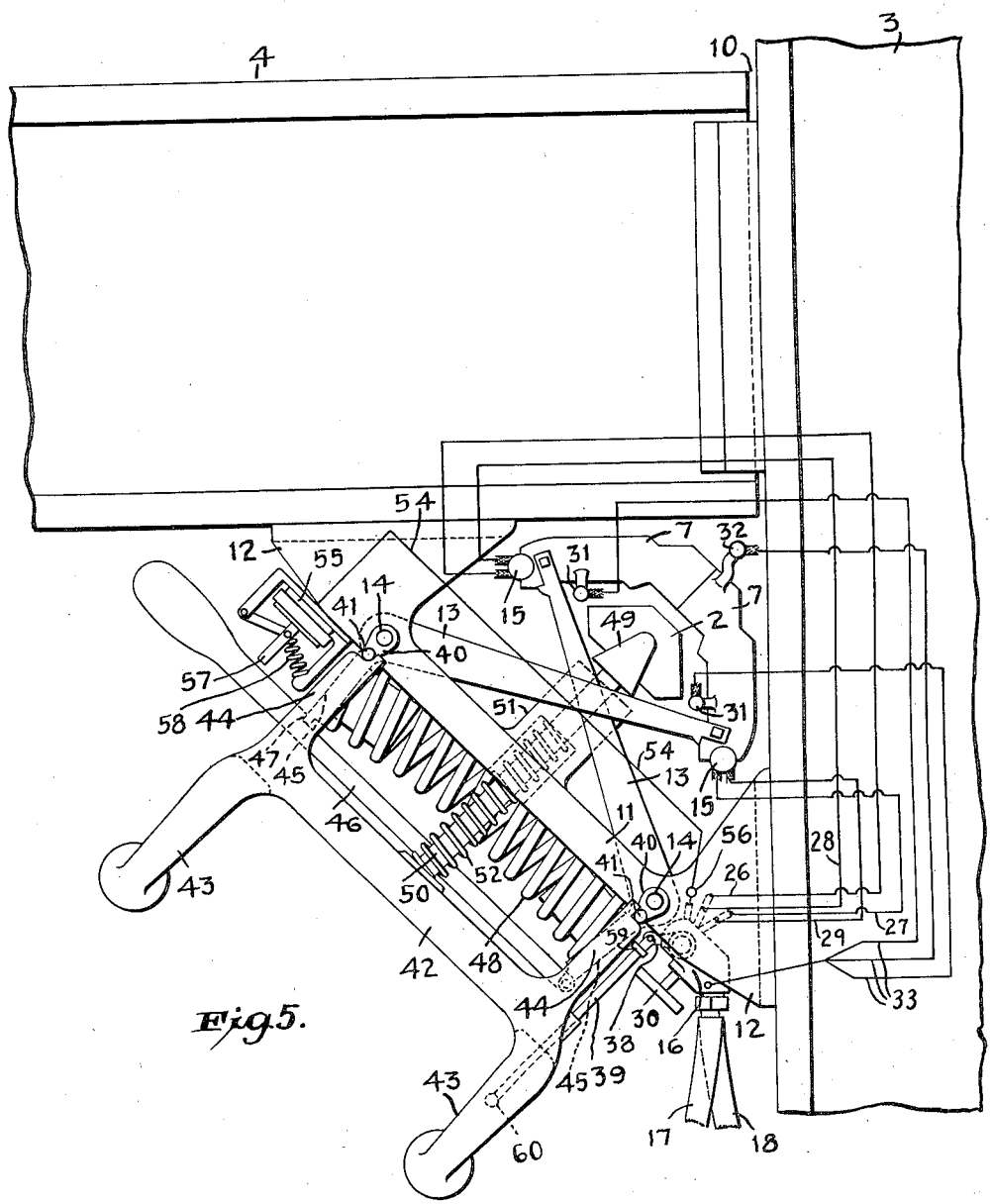
Fig. 5 is an elevation showing a semi-automatic apparatus in position for performing the work, hose lines being represented diagrammatically.

The joining block 2 is made with a conformation to fit the surfaces of the structural members which it is to unite. The drawings show an upright 3 and a transverse member 4 of conventional shape, for which joining blocks of triangular or other section having two faces 5, 6 at right angles to each other are employed. A complete joint between two such members would include a joining block in the included angle beneath the beam, between the flanges of the beam and the flanges of the upright, and two similar blocks in the included lateral angles between the web of the beam and the flanges of the upright.

In making this type of welded connection the joining block is held in proximity to the apex of the included angle between the surfaces of the members 3, 4 but spaced therefrom, and the torches 7 are held between the block and the members at definite spacing from the surfaces of both.

It is best to employ two torches, or torch heads, which can be readily withdrawn by separating them in directions transverse to the block. The torches form an angular shape and are provided with orifices to direct welding jets 8 toward the surfaces 5 and 6 of the block and other orifices to direct welding jets 9 toward the corresponding areas of the surfaces of the structural members. The torches are designed to deliver a sufficient number of jets distributed lengthwise and transversely to fuse simultaneously all portions of the areas involved. The jets are directed obliquely to the surfaces so that the combustion gases will sweep away oxid and foreign material, leaving clean molten films or layers, which are effectively protected by the carbon monoxid and hydrogen of the flame envelope. The proper melting of the surfaces having been effected, the torches are quickly withdrawn and the block is at once thrust into the corner, so that its surfaces contact simultaneously with the opposed surfaces of the structural members. The molten films covering the surfaces unite at once and quickly congealing form a strong and integral bond. The amount of force used is such as to insure a good union, and the pressure may be made sufficient to improve the grain structure of the surface-to-surface weld. Pressure likewise overcomes slight irregularities, and in this connection the heating may be such as to soften a depth of metal beneath the molten films.

The conditions obtained by the process are ideal for the production of sound and strong welds. Since the variations which are unavoidable in ordinary hand welding are eliminated, the consistent execution of good welds is made easy. Moreover, the fusion of surfaces only and the simultaneous heating and fusing of all portions of the areas entering into the weld tend to eliminate welding strains.

Finally, the use of this method solves the question of dimensional tolerances in structural steel welding, for as illustrated by Figs. 3 and 4 the space 10 between the members 3 and 4 can vary up to wide limits without affecting the strength of the structure. This is because the members to be united need not be welded directly to each other, but, instead, the members are welded each to a common junction piece. Thus, two welds are made simultaneously.

Figure 5 shows a semi-automatic apparatus for performing the process which has been described. The apparatus forms the subject-matter of a divisional application, Serial No. 577,284, filed November 25, 1931, now Patent No. 1,880,076, dated September 27, 1932, and is here shown and described in order to furnish an example of a concrete way of carrying the method into effect.

A primary frame 11 has legs 12 adapted to bear against the members 3, 4, so that it can be held in definite position by hand pressure. Manifestly, however, the device could be fastened to one or both members in a manner permitting of quick attachment and detachment. In either event, the frame is adapted to be applied to the members to be united so as to secure the desired positioning.

Two crossed arms 13, or two pairs of such arms, are connected to the primary frame by shafts 14, and carry the torches. These arms may be considered as part of the general frame since they are part of the system of support and serve during the fusion period to hold the torches in definite position, as shown.

Each torch 7 is in the nature of a block provided with suitable distributing passages and jet orifices, which need not be illustrated in detail since the principles governing the internal design of multiple jet welding torch "tips" are familiar to those skilled in the oxyacetylene welding art. The jets delivered by these torches are sufficiently numerous and properly distributed and arranged to heat and bring superficially to fusion the entire areas which are to be brought together. Each torch has a mixer 15 preferably associated directly with it, and each of these mixers is to be connected by two flexible gas conduits with outlet connections of a double cock 16 fixed to the primary frame. These short hose lengths have been shown diagrammatically in the view of the apparatus, since otherwise they would obscure the drawings.

The double cock has two inlet connections to receive hose lines 17 and 18 leading from sources of supply of oxygen and fuel gas, respectively, and the ports of the plug of this cock open and close communication between these two inlet connections and four outlet connections, two for oxygen and two for fuel gas. The oxygen outlet connections receive hose lengths 26 and 27, which conduct oxygen to the mixers of the respective torches, and similarly the fuel gas outlet connections receive hose lengths 28 and 29, which conduct this gas to the respective torches. Needle valves 30 are provided in the gas inlet passages to the double cock, for the purpose of adjusting the flames to the desired size and neutrality.

The torches carry pilot burners 31 at their under sides, and one of them carries a pilot burner 32 at the outer side, to ignite the two sets of jets. These burners are connected, by hose lengths 33, with a by-pass, through which fuel gas can flow when the double cock 16 is closed.

The double cock has an arm 38 which is connected with a rod 39 for opening and closing the cock.

The shafts 14 to which the arms 13 are fixed have short crank arms 40 provided with lugs 41. A handle-bar 42, terminating in rearwardly projecting handles 43, has forwardly projecting legs 44 adapted to bear against these lugs. This handle-bar forms a relatively movable part of the general frame as well as an operating member. During the fusion period, pressure applied to this bar serves to hold the frame and thereby the torches, and also the joining block 2, in the proper positions.

The torch arms 13, or the shafts to whch they are connected, have rearwardly projecting arms 45, one of these arms being pivoted to a latch bar 46, and the latter having a shoulder 47 to cooperate with the other of said arms. A spring 48 acting between the arms 45 exerts pressure which when released separates these arms and swings the torch arms so as to move the torches apart and out of the path of movement of the joining block into the corner formed by the structural members to be united. When this latch mechanism is set, the pressure of the spring is sufficient to keep the latch bar 47 in place, or means can be provided for urging the latch bar to its holding position.

The joining block 2 is held in a holder 49 on the forward end of a rod 50, which is slidable in a guide 51 on the primary frame 11 and has thrust connection at its rear end with the handle-bar 42. While the mechanism is latched this holder forms part of the frame which holds the torches and the joining block in predetermined spaced relations, with the torches between the block and the members which are to be united. When the latch is released the handle-bar serves as a means for thrusting the joining block into the angle of the structural members.

A light spring 52 may be provided for pressing the handle-bar 42 rearward; this, however, is for convenience and is not important.

The opening of the double-cock 16 serves to feed oxygen through a bleeder port to a hose 54, through which a very small proportion of oxygen passes to a timing valve 55 on the primary frame. The bleeder port is so calculated or this flow is so adjustable by a needle valve 56 that, when the requisite period for bringing the parts to surface fusion, or surface fusion plus sub-surface softening, has elapsed, the pressure beneath the diaphragm of the timing valve will be sufficient to move the pin 57 to a point at which a spring 58 connected with this pin acts to project the pin against the latch bar 46, to disengage the shoulder of this bar from the arm 45 with which it coacts.

Thereupon, the spring 48 swings the torch out of the way and forward pressure on the handle-bar 42 advances the joining block held in the holder 49 into the angle of the members to be united. The handle-bar in its forward movement also acts upon a collar 59 on the rod 39, to close the double cock 16.

The cock-operating rod 39 has a guide in the handle-bar 42 adjacent one of the handles 43 and terminates in a finger-piece 60 for opening the cock.

The use of the device in carrying out the method has been made clear in the course of the description, but it will be briefly reviewed.

The joining block 2 is placed in the holder 49. The latch 47 is set. The gases are turned on at the supply cylinders and the pilot burners 31, 32 are lighted. The operator grasps the handles 43 and holds the legs 12 of the primary frame against the structural members 3, 4. The torches and the filler-block are now precisely disposed for the heating and fusing operation and in readiness for the succeeding operation, which is the pushing of the joining block into the corner, the angular faces of which as well as the angular faces of the block will then have been melted. The operator opens the double cock 16, or other valve arrangement, by means of a finger piece 60, and the mixture of oxygen and fuel gas emerging from the jet orifices at opposite sides of the torches 7 is ignited by the pilot. Follows a comparatively brief period of heating of the surfaces of the block and of the structural members by the heat liberated by the oxyacetylene flames burning in the confined spaces between the torches and the structural members on the one hand and the joining block on the other hand. When the proper condition of surface fusion has been attained, the timing valve 55 operates to unlock the mechanism, whereupon the torches are moved away and the forward pressure which the operator is exerting on the handles 43 shoves the block 2 into the corner, where the surfaces of the block and of the structural members unite and congeal. At the same time the supply of gases to the welding flames is cut off. The reducing atmosphere supplied by the envelope gases are utilized to protect the fused surfaces from oxidation and chilling by the air, not only during the period while the surfaces are being brought to fusion but also during the momentary period required for removal of the torches and movement of the joining block to its final position.

Obviously the form and the details of the apparatus may be modified considerably.

I claim:

1. The method of uniting structural members which comprises applying heat from oxyacetylene flames simultaneously to surfaces of the members to be united and of a joining block while said surfaces are apart and in relation to be brought into contact, thereby quickly producing a condition of surface fusion of the metal, meanwhile protecting said surfaces by the flame envelope gases, and thereupon instantly pressing the fused areas of the joining block against the fused areas of both said members simultaneously.

2. The method of uniting a horizontal structural member to a vertical structural member which comprises positioning a joining block having right-angular surfaces within and separated from the angle between the members, simultaneously fusing the metal of said surfaces and of corresponding areas of the surfaces of the structural members by means of oxyacetylene flames, and thereupon instantly pressing said block into the included angle between the structural members.

3. The method of uniting two metal parts by a third part constituting a joining piece, which comprises applying the heat of high velocity, high temperature flame jets, fed by a mixture of oxygen and hydrocarbon gas, simultaneously to surfaces of the parts to be united and of the joining piece while said surfaces are apart and in relation to be brought into contact, at the same time blanketing the surfaces with reducing gases, thereby fusing the outer metal so that the surfaces are covered with clean molten metal, and immediately this condition has been attained bringing the fused areas of the joining piece against the fused areas of both said parts simultaneously.

4. The method of uniting two metal parts by a third part constituting a joining piece, which comprises applying the heat of high velocity, high temperature flame jets, fed by a mixture of oxygen and hydrocarbon gas, simultaneously to surfaces of the parts to be united and of the joining piece while said surfaces are apart and in relation to be brought into contact, at the same time blanketing the surfaces with reducing gases, thereby fusing the outer metal so that the surfaces are covered with clean molten metal, sufficient heat being applied also to soften the metal beneath for a substantial depth, and immediately these conditions have been attained bringing the fused areas of the joining piece against the fused areas of both said parts simultaneously.

5. The method of uniting metal members, surfaces of which, respectively, are in angular relation to each other, which comprises providing a joining piece which has two surfaces of similar angular relation and which is adapted to fit the included angle between the surfaces of the members to be united, applying heat of high temperature flames simultaneously to the angularly related surfaces of the joining piece and to corresponding areas of the angularly related surfaces of the members, while said surfaces are apart, thereby fusing the outer metal so that the surfaces are covered with molten metal, and thereupon pressing the fused areas of the joining piece against the fused areas of both said members simultaneously.

6. The method of uniting two metal parts by a third part constituting a joining piece, which comprises applying the heat of high-temperature flame jets, fed by a mixture of oxygen and hydrocarbon gas, simultaneously to surfaces of the parts to be united and of the joining piece while said surfaces are apart and in relation to be brought into contact, at the same time blanketing the surfaces with reducing gases, thereby fusing the outer metal so that the surfaces are covered with clean molten metal, and immediately this condition has been attained bringing the fused areas of the joining piece against the fused areas of both of said parts simultaneously.

GEORGE M. DEMING.